Figure 1:
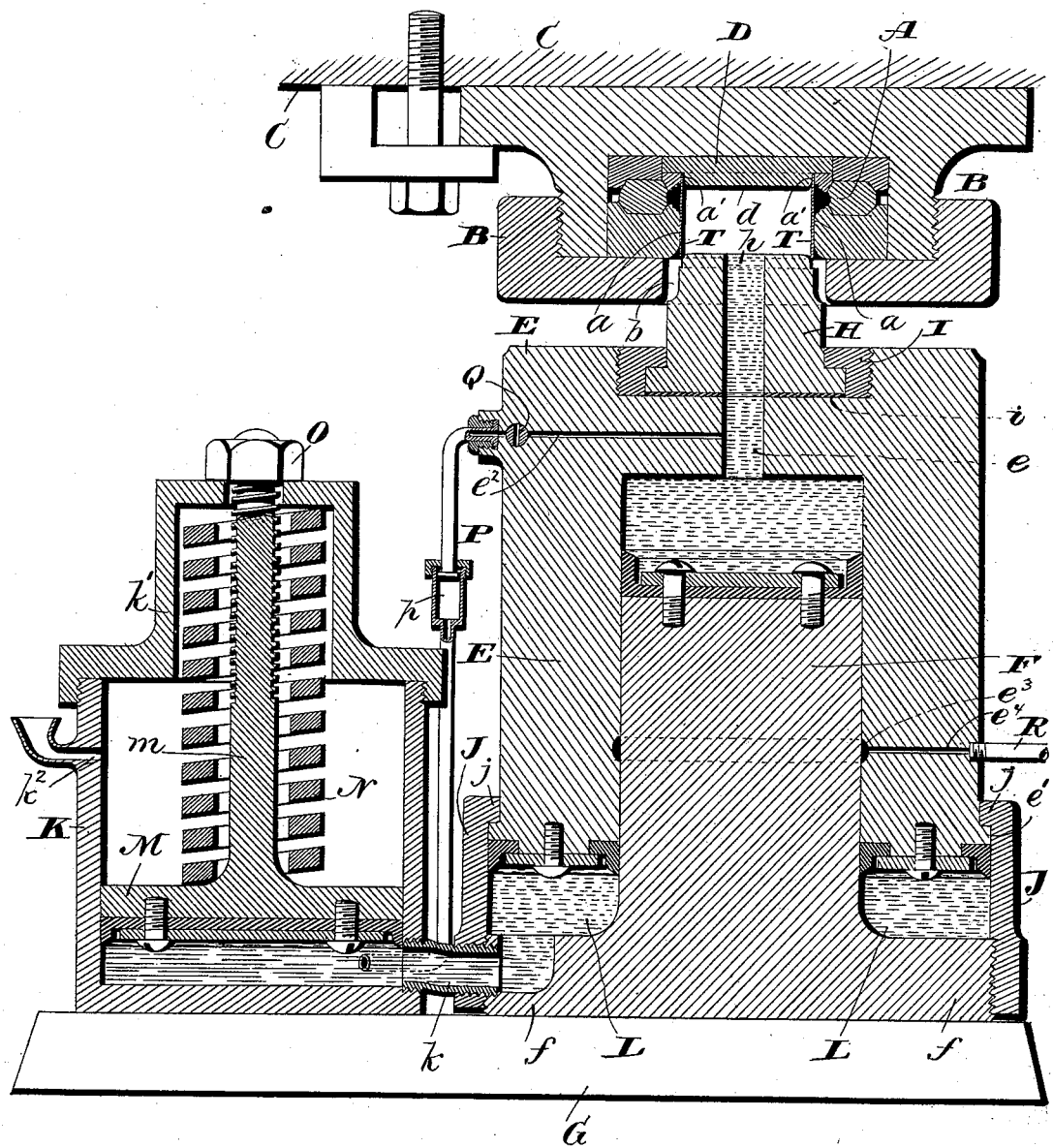

(No Model.) 2 Sheets—Sheet 1.

F. MOORFIELD.
APPARATUS FOR FORMING OR SHAPING HOLLOW ARTICLES.

No. 506,247. Patented Oct. 10, 1893.

Witnesses
Chas. J. Williamson
Jas. C. Hutchinson

Inventor
Frank Moorfield
by Pringle & Russell
his Attorney

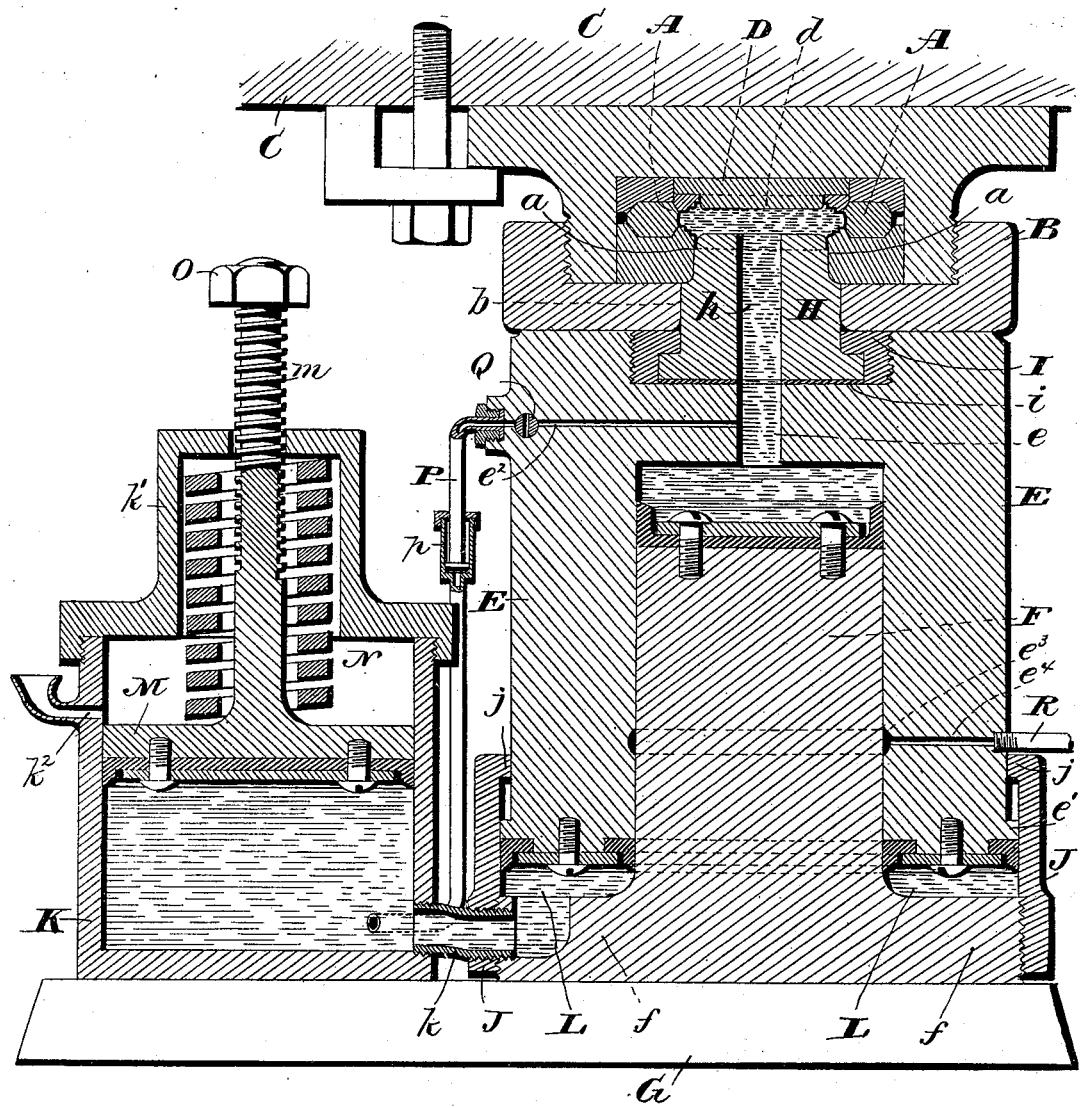

UNITED STATES PATENT OFFICE.

FRANK MOORFIELD, OF NEWARK, NEW JERSEY.

APPARATUS FOR FORMING OR SHAPING HOLLOW ARTICLES.

SPECIFICATION forming part of Letters Patent No. 506,247, dated October 10, 1893.

Application filed September 21, 1892. Serial No. 446,392. (No model.)

*To all whom it may concern:*

Be it known that I, FRANK MOORFIELD, a citizen of the United States, residing at Newark, in the county of Essex, and in the State of New Jersey, have invented certain new and useful Improvements in Apparatus for Forming or Shaping Hollow Articles; and I do hereby declare that the following is a full, clear, and exact description thereof, reference being had to the accompanying drawings, in which—

Figure 1 shows a vertical section of my apparatus with a blank in position in the die, and the nipple of the cylinder just entering the blank and Fig. 2 a like view with the parts in the position they occupy on the completion of the article to be formed.

Letters of like name and kind refer to like parts in both figures.

The object of my invention is to provide improved apparatus for the manufacture of hollow or other articles of all kinds that are made from sheet metal by the use of shaping or forming devices, and to this end, said invention consists in the apparatus and in the parts thereof, adapted to form or shape bodies or articles, by the employment of a fluid, as water, introduced into a suitable blank, and subjected while therein to pressure, substantially as and for the purpose hereinafter specified.

My present invention in respect to its general features, is similar to the one for which Letters Patent, No. 476,058, were issued to me May 31, 1892; that is to say, I employ, as in that case, a suitable die or shaping tool whose configuration or conformation, it is desired to impart to the article, and means for introducing fluid under pressure into a blank, when in said die or tool.

The die or other shaping tool A may be of any desired structure adapted to the necessities of the case. The one shown is designed to form a watch case center, and is of the sectional kind commonly used in conjunction with a roller. Said die is held in a chuck or holder B, that is securely clamped or bolted to the under side of the head C of a suitable, powerful press, preferably, hydraulic. Access to the die opening $a$, is had through a circular opening $b$ in the bottom of the chuck. Projecting down into said die opening $a$, a short distance is an extension $d$ of a block D that is held in the chuck by the engagement of the die parts, which extension $d$ has a diameter so much less than the internal diameter of the adjacent part of the die, that an annular space $a'$ is left between them.

Axially in line with and below the die A is a cylinder E, up into which, from its lower end, extends a plunger or piston F, that is mounted upon and moves with the bed or platen G of the press. The upper end of the cylinder E is closed, except as to a comparatively small, centrally located, vertical passage or opening $e$, and secured to such end is a nipple H having its opening $h$ of the same diameter as, and in line with the opening $e$ in the cylinder. The nipple, as in my patent referred to, is designed to enter a short distance into and form a close joint with the blank, when the same is in the die, and for this purpose has its upper end reduced in diameter, to enter the blank, but fitting it snugly, and to form a shoulder to abut against the end or edge thereof. The nipple is preferably detachably connected to the cylinder to enable the substitution of other nipples for different work, but, of course, if desired, it can be integral with the cylinder. It is shown in the drawings as detachably connected, and the attaching means consist of an externally threaded ring I which screws into a threaded cavity in the cylinder end and has an internally projecting flange, which engages an externally projecting flange at the lower end of the nipple. A thin gasket or washer $i$ is interposed between the underside of the nipple and the bottom of the cylinder cavity to make a water tight joint. At its base the plunger F has an annular enlargement $f$, upon whose threaded periphery is screwed the lower end of a short, vertical cylinder J, into which the lower end of the cylinder E extends. Upward movement of the latter in the former is limited by an inwardly projecting flange $j$, at the upper end of the cylinder J, that is adapted to engage an outwardly projecting flange $e'$ at the lower end of the cylinder E. Also resting upon and carried by the press bed or platen G, is a chamber K that is connected at its bottom by a pipe $k$ with the annular space L in the cylinder J beneath the lower end of the cylinder E and around the lower portion of the plunger F immediately above the enlargement $f$. Vertically movable in said chamber is a piston M, and encircling the upwardly extending stem or rod $m$ of the latter is a strong, coiled spring N, that at one end bears on the upper side of the piston and at the other end against a cap or bonnet $k'$, which closes the chamber at its upper end. The stem $m$ passes through an opening in the cap, and, outside of the latter, carries a nut O adapted to engage the same and limit the downward movement of the piston under stress of the spring. Said stem is threaded to such an extent, as to enable the nut O thereby to move the piston M to or nearly to the top of the chamber against the stress of the spring, for a purpose to appear.

The annular space L below the cylinder E and the space in the chamber K below the piston are to be filled with a fluid, preferably, water, for the purpose of imparting to the lower end of the cylinder E the pressure of the spring N. Such water can be placed in these spaces in any desired way, as for instance by providing a small opening $k^2$ through the side of the chamber K near the top thereof, at a point above which the piston M does not normally rise when the apparatus is being used, but to and beyond which it can be taken by turning the nut O, when it is desired that water shall be passed through the passage below said piston. When the desired quantity of water has been put into the cylinder, the nut O is turned to allow the spring to move the piston down into the cylinder past the opening $k$.

Water for effecting the conformation of the blank to the die, is placed in the space in the cylinder E above the plunger F, and may be simply poured therein through the nipple opening, or, as I prefer, it may be taken from the chamber K, by a pipe P that connects said chamber near its lower end with a small passage $e^2$ that extends from the opening or passage $e$ in the cylinder E out to its surface. The pipe P is made in two parts, with a sliding or telescoping section $p$ uniting them, to permit vertical movement of the cylinder E relative to the chamber, and to control the passage of water, a valve Q is provided in the opening $e^2$ in the cylinder.

At a point about midway between the upper end of the plunger F and the lower end of the cylinder E, an annular groove $e^3$ is provided in the inner wall of said cylinder to catch any water leaking down from above the plunger or up from below the cylinder end. From said groove the water is conveyed by a lateral opening $e^4$ through the cylinder wall to a discharge pipe R screwed into the latter at the outer end of the opening $e^4$.

My apparatus is adapted for the formation of a great variety of hollow articles, but its operation, it is thought, will be made perfectly clear by describing the making of a watch case center.

The blank employed in making a center, consists simply of a short section of tubing T, open from end to end, which, with the press bed or platen lowered sufficiently to permit it, is placed in position within the die A, with its upper portion in the annular space $a'$ and its upper end abutting against the block D, so that a water tight joint is formed between the parts at this point. The press is now operated to cause the platen G to move upward with the parts carried by it, whereupon the reduced portion of the nipple will enter the lower end of the blank T, until the edge of the latter is engaged by the shoulder on the nipple. The upward movement of the platen being continued, unless the blank bend or buckle, the upward movement of the cylinder E will be resisted, and will cease, but that of the plunger will continue, and result in the forcing of the water above it up through the cylinder opening $e$ and the nipple opening into the blank, and, as the movement progresses, with such pressure, as to cause the blank to be forced into and conformed to the die. As the blank shortens lengthwise in consequence of being expanded into the die, the nipple follows it up and its shoulder keeps in contact with the edge of the blank, with such pressure, as to form a water-tight joint. When, as is designed, the upper end of the cylinder E, abuts against the under face of the chuck B, the latter resists the upward movement of said cylinder, and the finishing pressure is applied to the blank with said parts in engagement. Should the blank buckle or bend and enter the die matrix, the upward movement of the cylinder will continue until its top engages the chuck B, and the latter then will hold the cylinder, while the plunger moves up therein and displaces the water above it and causes it to enter the blank. Under any circumstances, however, before the completing pressure is applied to the blank, an abutment occurs between the top of the cylinder E and the chuck B. As the plunger F ascends in the cylinder E, the water below the latter is forced out into the chamber K and raises the piston therein against the stress of the coiled spring N. Simultaneously with the lowering of the press platen C to remove the nipple from within the die, upon the completion of the center, the spring moves the piston N downward and forces the water out of the chamber K back into the space below the cylinder E with such pressure, as to restore and maintain the elevated position of the cylinder with reference to the plunger F. The upward movement of the cylinder, or rather the downward movement of the plunger therein, by increasing the space above said plunger provides for the accommodation of such water as was forced into the blank, which simply flows back into the cylinder. This return of the water to the cylinder is insured, and its escape around the sides of the nipple prevented, by making the nipple below its blank-engaging shoulder of such diameter as to fit the die-opening *a* in a water tight manner. It is of course, obvious, that the die holder can be mounted, so as to be the movable part of the apparatus and the nipple carrying parts be stationary, and that other changes can be made which will be simply within the province of the skilled mechanic, and not involve invention. It will be seen, too, that by proper adaptation of the parts my apparatus can be used to ornament or emboss flat sheet metal, as well as to give shape to or ornament articles, that when finished, are, strictly speaking, hollow.

Having thus described my invention, what I claim is—

1. In apparatus for making or shaping hollow articles, the combination with a press, of a cylinder and plunger mounted upon, and both movable with a moving part of the press, and an abutment to engage and stop the cylinder, while allowing continued movement of the plunger to expel the contents of the cylinder, substantially as and for the purpose specified.

2. In apparatus for making or shaping hollow articles, the combination with a press, of a vertically disposed cylinder and plunger mounted upon and both movable with a moving part of the press, the cylinder having in its upper end a discharge opening, through which its contents may be forced by the plunger, and a stop or abutment to engage and stop upward movement of the cylinder while permitting further upward movement of the plunger to expel the contents of the cylinder, substantially as and for the purpose shown.

3. In apparatus for forming hollow articles, the combination with a press of a cylinder and plunger mounted upon and both movable with a moving part of the press, an abutment to engage and stop the cylinder while allowing continued movement of the plunger to expel the contents of the cylinder, and a spring placed under tension by the relative movement of the plunger and cylinder, and operating by its expansion to restore the relative positions of said parts after such movement, substantially as and for the purpose described.

4. In apparatus for making or shaping hollow articles, the combination with a press, of a die holder mounted thereon, a cylinder and a plunger in the latter, mounted on the press bed or platen and movable thereby toward the die-holder to cause the same and the cylinder to abut, to stop the movement of the latter but not that of the plunger, substantially as and for the purpose set forth.

5. In apparatus for forming or shaping articles, the combination with a die and a cylinder having a discharge opening, of a plunger or piston in the cylinder to effect the expulsion of fluid therefrom, into a blank in the die and the spring to restore the position of the parts after such expulsion of the fluid, substantially as and for the purpose specified.

6. In apparatus for forming or shaping articles, the combination with a die and a cylinder having a discharge opening at one end, of a plunger or piston to effect the expulsion of fluid therefrom, into a blank in the die and a spring for applying pressure to the other end of the cylinder, substantially as and for the purpose shown.

7. In forming or shaping apparatus, the combination with a cylinder having a discharge opening at one end, of a plunger or piston movable therein to force its contents out through said discharge opening, a chamber communicating with a space at the other end of the cylinder, and a piston in such chamber adapted to apply pressure to said other end of the cylinder through the medium of an interposed fluid, substantially as and for the purpose set forth.

8. In forming or shaping apparatus, the combination with a cylinder having a discharge opening at its upper end, of a plunger or piston in the cylinder to force its contents out through such discharge opening the second cylinder inclosing the lower end of the first, the chamber communicating with said second cylinder, and the spring-pressed piston in said chamber, substantially as and for the purpose described.

9. In forming or shaping apparatus, the combination with a cylinder having a discharge opening, of a piston or plunger in said cylinder to effect the expulsion of fluid from the cylinder, a fluid holding chamber having a piston to apply pressure through the fluid to said cylinder, and a pipe connecting said chamber and the interior of the cylinder, substantially as and for the purpose specified.

10. In forming or shaping apparatus, the combination with a press, of a die holder or chuck attached to the head thereof, the cylinder, and the plunger therein mounted on the press platen, said cylinder having a discharge opening at its upper end, the chamber also on the press platen and communicating with a space below the cylinder, and a spring-pressed piston in the chamber, substantially as and for the purpose set forth.

In testimony that I claim the foregoing I have hereunto set my hand this 5th day of September, 1892.

FRANK MOORFIELD.

Witnesses:
C. T. GLEN,
JOHN WELCH.